(12) United States Patent
Baumgarte

(10) Patent No.: US 11,708,715 B2
(45) Date of Patent: *Jul. 25, 2023

(54) NETWORKED DOOR CLOSER

(71) Applicant: Schlage Lock Company LLC, Carmel, IN (US)

(72) Inventor: Joseph W. Baumgarte, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/941,062

(22) Filed: Jul. 28, 2020

(65) Prior Publication Data

US 2021/0148156 A1    May 20, 2021

Related U.S. Application Data

(60) Continuation of application No. 16/253,870, filed on Jan. 22, 2019, now Pat. No. 10,724,288, which is a
(Continued)

(51) Int. Cl.
*E05F 15/79*    (2015.01)
*E05F 15/77*    (2015.01)
(Continued)

(52) U.S. Cl.
CPC ............. *E05F 15/63* (2015.01); *E05F 3/22* (2013.01); *E05F 3/222* (2013.01); *E05F 3/227* (2013.01);
(Continued)

(58) Field of Classification Search
CPC . E05F 15/79; E05F 15/77; E05F 15/73; E05F 15/63; E05F 3/222; E05F 3/227;
(Continued)

(56) References Cited

U.S. PATENT DOCUMENTS 4,463,348 A    7/1984  Sidebottom
5,479,151 A   12/1995  Lavelle et al.
(Continued)

FOREIGN PATENT DOCUMENTS

DE    102011050488 A1   11/2012
WO      2006042259 A2    4/2006
(Continued)

OTHER PUBLICATIONS

International Search Report; International Searching Authority; US Patent and Trademark Office; International Application No. PCT/US2016/035052; dated Aug. 31, 2016; 2 pages.
(Continued)

*Primary Examiner* — Christopher E Mahoney
*Assistant Examiner* — Kendrick X Liu
(74) *Attorney, Agent, or Firm* — Taft Stettinius & Hollister LLP

(57) ABSTRACT

A door closer assembly for an entryway device having a position sensor that assists in determining the location of the door closer assembly, and thus the location of the associated entryway device, relative to at least an entryway. The position sensor can be coupled to, and/or part of, the door closer assembly. Information obtained by the position sensor may be used by one or processing devices of an access control system to determine whether the door closer assembly and/or the entryway device is at the closed location, among other locations, as well as the direction(s) of displacement of the entryway device. Such information may be utilized in calibrating other devices, as well as determining the occurrence of a number of events, including unauthorized displacement or holding of the entryway device. A timer may also be utilized to further evaluate the nature of the displacement of the entryway device.

21 Claims, 4 Drawing Sheets

Related U.S. Application Data division of application No. 14/882,554, filed on Oct. 14, 2015, now Pat. No. 10,184,284.

(60) Provisional application No. 62/169,078, filed on Jun. 1, 2015.

(51) Int. Cl.

| | | |
|---|---|---|
| *E05F 15/73* | (2015.01) | |
| *E05F 15/63* | (2015.01) | |
| *E05F 3/22* | (2006.01) | |
| *G01B 7/00* | (2006.01) | |
| *G01B 7/14* | (2006.01) | |
| *E05F 15/40* | (2015.01) | |

(52) U.S. Cl.
CPC .............. *E05F 15/40* (2015.01); *E05F 15/73* (2015.01); *E05F 15/77* (2015.01); *G01B 7/003* (2013.01); *G01B 7/14* (2013.01); *E05F 15/79* (2015.01); *E05F 2015/631* (2015.01); *E05Y 2400/32* (2013.01); *E05Y 2400/322* (2013.01); *E05Y 2400/44* (2013.01); *E05Y 2400/45* (2013.01)

(58) Field of Classification Search
CPC ........... E05Y 2400/322; E05Y 2400/44; E05Y 2400/45; G01B 7/003; G01B 7/14
See application file for complete search history.

(56) References Cited

U.S. PATENT DOCUMENTS

| | | | |
|---|---|---|---|
| 5,874,989 | A | 2/1999 | O'Brien et al. |
| 6,886,217 | B2 | 5/2005 | Foster |
| 7,196,611 | B2 | 3/2007 | Robb et al. |
| 7,971,316 | B2 | 7/2011 | Copeland, II et al. |
| 8,261,491 | B2 | 9/2012 | Yulkowski et al. |
| 8,407,937 | B2 | 4/2013 | Houser |
| 8,564,235 | B2 | 10/2013 | Burris et al. |
| 8,600,567 | B2 | 12/2013 | Copeland, II et al. |
| 8,773,237 | B2 | 7/2014 | Burris et al. |
| 8,779,713 | B2 | 7/2014 | Burris et al. |
| 9,045,927 | B1* | 6/2015 | Hoffberg ................... E05F 3/10 |
| 9,064,394 | B1 | 6/2015 | Trundle |
| 10,184,284 | B2* | 1/2019 | Baumgarte ............. E05F 15/63 |
| 2003/0179074 | A1 | 9/2003 | Palomaki et al. |
| 2006/0197481 | A1 | 9/2006 | Hotto et al. |
| 2006/0244271 | A1 | 11/2006 | Hass |
| 2009/0051528 | A1* | 2/2009 | Graichen ................. G07C 9/38 340/545.2 |
| 2009/0249699 | A1 | 10/2009 | Yulkowski |
| 2010/0115853 | A1* | 5/2010 | Gebhart ..................... H02P 6/28 49/506 |
| 2012/0169880 | A1 | 7/2012 | Willliamson |
| 2012/0210647 | A1 | 8/2012 | McKibben et al. |
| 2013/0314232 | A1 | 11/2013 | Jerhotova et al. |
| 2014/0062466 | A1* | 3/2014 | Thibault .................. G01B 7/14 324/207.22 |
| 2014/0182206 | A1* | 7/2014 | Yulkowski ............. G08B 21/18 49/506 |
| 2014/0292001 | A1 | 10/2014 | Nunez et al. |
| 2014/0292481 | A1 | 10/2014 | Dumas et al. |
| 2014/0304942 | A1 | 10/2014 | Li et al. |
| 2014/0330436 | A1* | 11/2014 | Copeland, II .......... G05B 11/01 713/323 |
| 2016/0149721 | A1* | 5/2016 | Wakeyama .......... G08B 29/188 455/414.1 |
| 2016/0168899 | A1* | 6/2016 | Scheiermann .......... E05F 15/40 49/506 |
| 2016/0189531 | A1* | 6/2016 | Modi .................... G08B 29/188 340/506 |
| 2016/0290005 | A1 | 10/2016 | Goldenson |
| 2018/0135337 | A1 | 5/2018 | Johnson et al. |

FOREIGN PATENT DOCUMENTS

| | | |
|---|---|---|
| WO | 2008134442 A1 | 11/2008 |
| WO | 2011141056 A1 | 11/2011 |
| WO | 2013163124 A1 | 10/2013 |

OTHER PUBLICATIONS

Written Opinion; International Searching Authority; US Patent and Trademark Office; International Application No. PCT/US2016/035052; dated Aug. 31, 2016; 6 pages.

European Extended Supplemental Search Report; European Patent Office; European Patent Application No. 16804239.8; dated Dec. 6, 2018; 9 pages.

European Examination Report; European Patent Office; European Application No. 16804239.8; dated Jan. 21, 2020; 4 pages.

\* cited by examiner

NETWORKED DOOR CLOSER

CROSS REFERENCE TO RELATED APPLICATIONS

The present application is a continuation of U.S. patent application Ser. No. 16/253,870 filed Jan. 22, 2019 and issued as U.S. Pat. No. 10,724,288, which is a divisional of U.S. patent application Ser. No. 14/882,554 filed Oct. 14, 2015 and issued as U.S. Pat. No. 10,184,284, which claims the benefit of U.S. Provisional Patent Application No. 62/169,078 filed Jun. 1, 2015, the contents of each application are hereby incorporated herein by reference in their entirety.

BACKGROUND

Embodiments of the present invention generally relate to determining the position of entryway devices. More particularly, but not exclusively, embodiments of the present invention relate to the determination and communication of the position of an entryway device by a door closer assembly.

Door closers, including, but not limited to, automatic door openers, are often utilized to provide a force or other action that at least assists in the displacement of an entryway device between an open location and a closed location. Moreover, a door closer can provide a force that at least assists the displacement of an entryway device, including a door, gate, or barrier, among other devices, to a closed location, for example, at which the entryway device may be positioned to inhibit or prevent ingress/egress through an associated entryway. Thus, door closers may be structured to automatically return an opened, or partially opened, entryway device to a closed location, and thereby remove the need for manual closing by a user.

Whether an entryway device is at an open or closed location has traditionally been automatically determined through the use of supplemental sensors that are applied to the entryway device or the lockset device. Yet, such supplemental sensors can add to the complexity and/or overall cost of the entryway system. Further, the inclusion of such supplemental sensors may increase the time and costs associated with installation of the entryway device, including, for example, costs associated with the installation, calibration, and/or preparation of the supplemental sensor(s). Further, in at least certain instances, the supplemental sensors may be limited to indicating whether the entryway device is in the open location or is in the closed location, and thereby not provide an indication of where the entryway device may be between the open and closed locations.

BRIEF SUMMARY

An aspect of an embodiment of the present application is a method that includes detecting, by a position sensor, data indicating a position of a door closer assembly. Further, at least a portion of the position sensor is positioned within the door closer assembly. The detected data is transmitted to a processing device and evaluated by the processing device in view of one or more sets of reference data. Additionally, the one or more sets of reference data can correspond to one or more locations of the door closer assembly. The method further includes determining, based on the evaluation of the detected data and the one or more sets of reference data, a current location of the door closer assembly.

Another aspect of an embodiment of the present application is a method that includes monitoring a position and a displacement of an entryway device via a position sensor of a door closer assembly, the door closer assembly being located on the entryway device. The data obtained by the position sensor is transmitted to a component within a lockset device, at least a portion of the lockset device being located on the same entryway device as the door closer assembly. Additionally, a magnetometer located within the lockset device is calibrated using the data received by the component that was obtained by the position sensor of the door closer assembly.

Additionally, an aspect of an embodiment of the present application is a method that includes detecting, by a position sensor of a door closer assembly, a position of a door closer assembly. Further, at least a portion of the door closer assembly is coupled to an entryway device. A processing device can use the detected position tin determining that at least one of the door closer assembly and the entryway device is at a closed location. Further, the determination of the processing device that at least one of the door closer assembly and the entryway device is at the closed location can be communicated to a lockset device that is coupled to the entryway device. Additionally, upon receipt of the communication of that at least one of the door closer assembly and the entryway device is at the closed location, a sensor located within the lockset device can be calibrated

BRIEF DESCRIPTION OF THE DRAWINGS

The description herein makes reference to the accompanying figures wherein like reference numerals refer to like parts throughout the several views.

Figure 1:
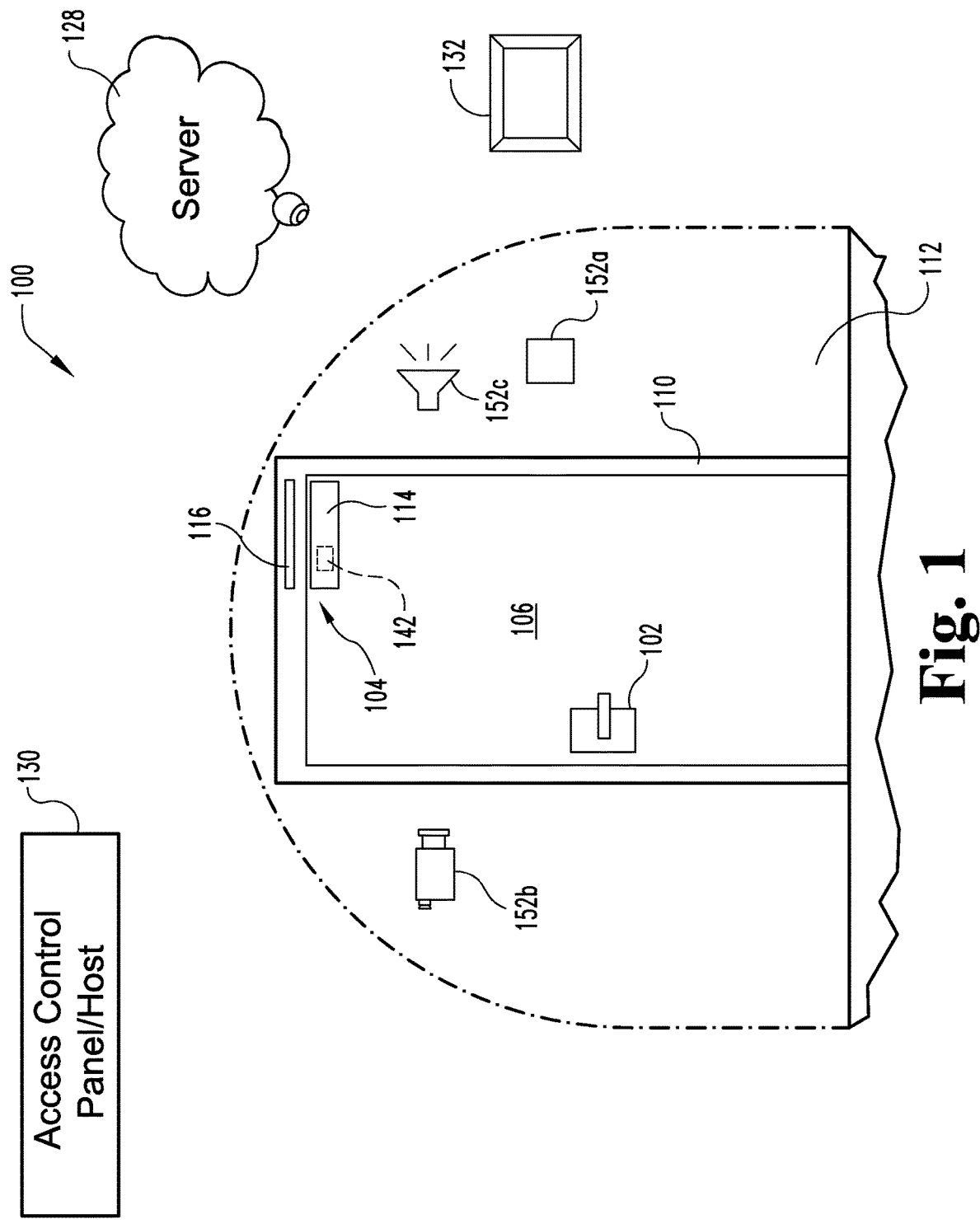
FIG. 1 illustrates a schematic view of an exemplary access control system that utilizes a door closer assembly in connection with determining and communicating the position of the door closer assembly and/or an associated entryway device.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of"

followed by a list of two or more items, such as "A, B or C," means any individual one of A, B or C, as well as any combination thereof.

Figure 2:
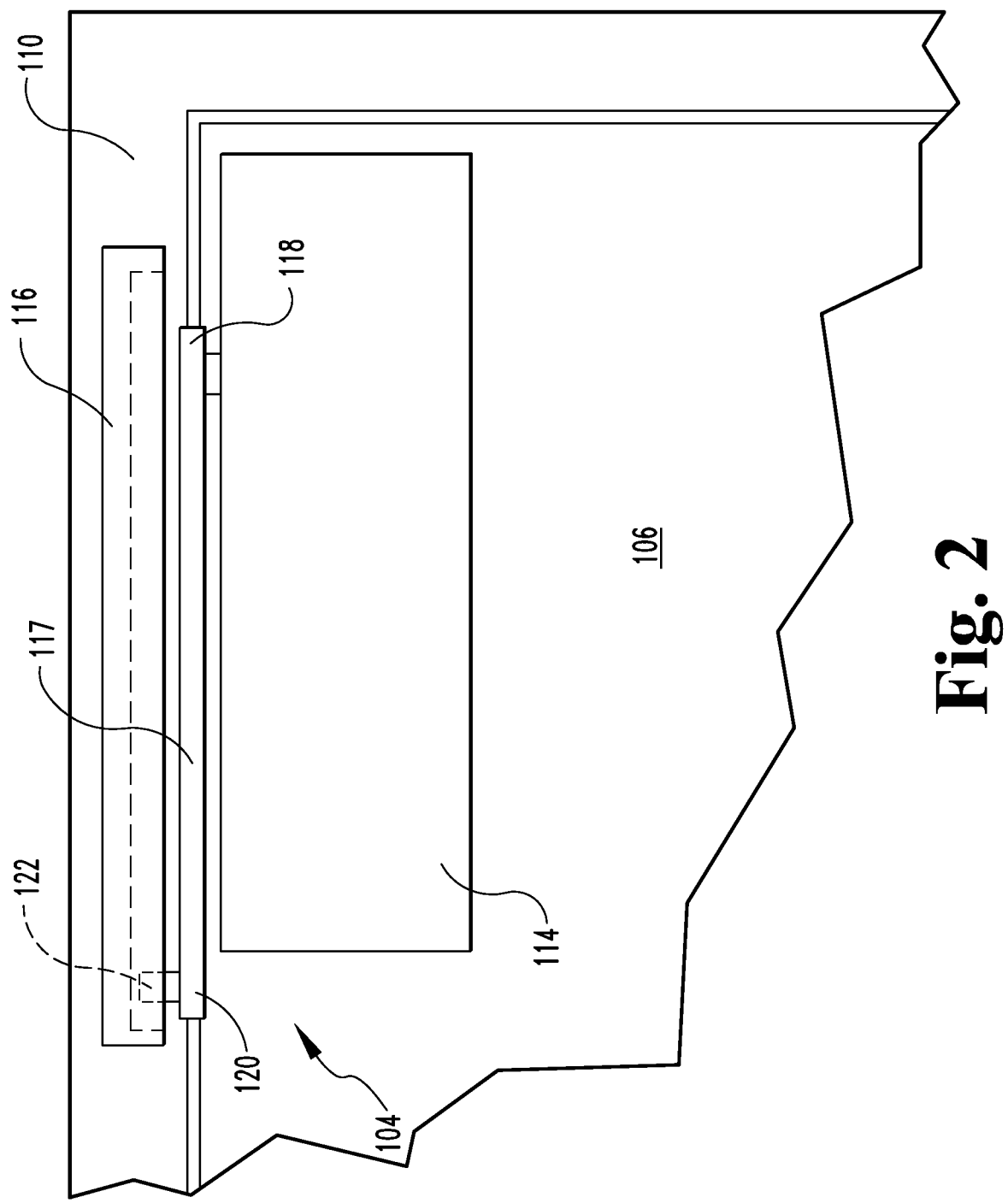
FIG. 2 illustrates a front view of an exemplary door closer assembly positioned on an entryway device and an adjacent entryway frame or wall.
Figure 3:
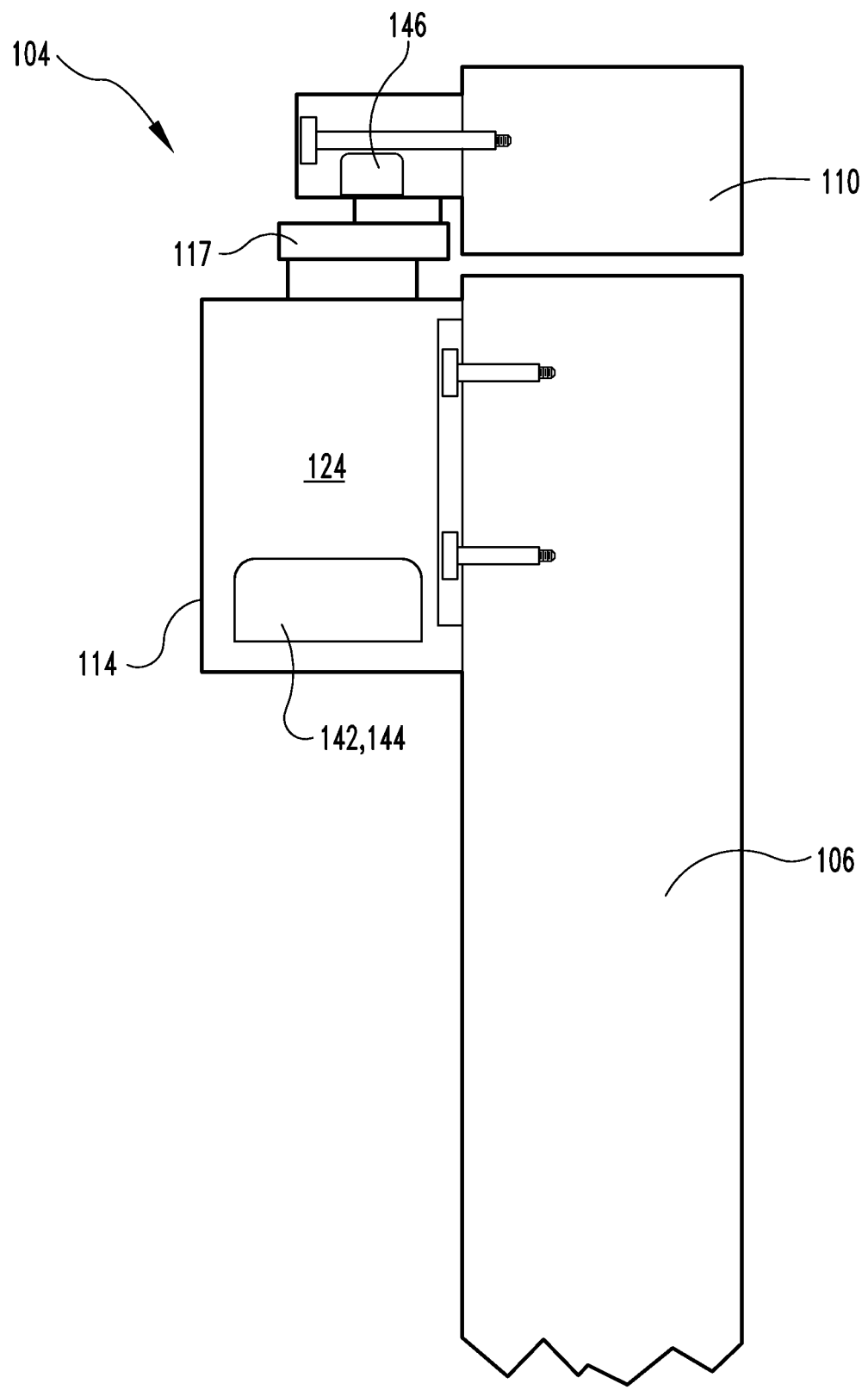
FIG. 3 illustrates a side cutaway view of the exemplary door closer assembly, entryway device, the entryway frame, and the wall that are shown in FIG. 1.

FIGS. 1-3 illustrate an exemplary access control system 100 that includes an exemplary lockset device 102 and an exemplary door closer assembly 104 that are operably coupled to an entryway device 106, such as, for example, a door or gate, among other similar devices. The ability to displace the entryway device 106 from a closed location, wherein the entryway device 106 is positioned to prevent passage through an associated entryway, to an open location may be controlled, at least in part, by the operation of the lockset device 102, at least a portion of which can be operably mounted, or otherwise coupled, to at least the entryway device 106. According to certain embodiments, the lockset device 102 is an electronic lockset device that includes a lock mechanism 108, that includes, for example, a bolt and/or latch, that can selectively lockingly engage the adjacent entryway frame 110, wall 112, and/or mating components that are coupled or mounted to/in the adjacent entryway frame 110 and/or wall 112 when the entryway device 106 is at least in the closed location.

According to the depicted embodiment, the door closer assembly 104 can include a closer body 114 that is coupled to a slide channel 116 by one or more closer arms 117. According to the illustrated example, a first end 118 of a closer arm 117 may be pivotally coupled to the closer body 114, while a second end 120 of the closer arm 117 is pivotally coupled to, and displaceable along, the slide channel 116. Embodiments of the present application are, however, not limited to the exemplary door closer assembly 104 discussed herein, and may be utilized with a variety of other types of door closer assemblies.

The closer body 114 and the slide channel 116 may be mounted at a variety of different locations along an entryway device 106, entryway frame 110, and/or wall 112. For example, according to the illustrated embodiment, at least one of the closer body 114 and the slide channel 116 may be mounted by a mechanical fastener, such as, for example, a screw, bolt, or pin, or via an adhesive, among other manners of mounting, to an outer surface of an entryway device 106, while the other of the closer body 114 and the slide channel 116 is mounted to the entryway frame 110, or a portion of a wall 112 that is adjacent to the entryway device 106 or entryway frame 110. Alternatively, according to certain embodiments, rather than being mounted on, or extending from, an outer surface of the entryway device 106, entryway frame 110, and/or wall 112, at least a portion of the closer body 114 and/or the slide channel 116 may be at least partially concealed or recessed within entryway device 106, entryway frame 110, and/or wall 112.

The first end 118 of the closer arm 117 may be pivotally coupled to the closer body 114 in a variety of manners, including, but not limited to, by a first coupler, including a pin, post, or bolt, among other connections. According to certain embodiments, the first end 118 of the closer arm 117 may be pivotally coupled to a backcheck mechanism or valve that may be used to at least control the speed at which the entryway device 106 may be displaced from an open location to a closed location. According to certain embodiments, the backcheck mechanism may be of the hydraulic type.

The slide channel 116 may, according to certain embodiments, be a channel or track that receives slideable insertion of an arm coupling 122, such as, for example, a pin, post, projection, or bolt, that is coupled to the second end 120 of the closer arm 117. Moreover, the arm coupling 122 may be coupled to the second end 120 of the closer arm 117 in a manner that allows both rotational and linear displacement of the closer arm 117 relative to slide channel 116 as the closer arm 117 is displaced with the opening and closing of the entryway device 106. Further, according to other embodiments, the closer arm 117 may include two or more arm segments. For example, according to certain embodiments, the closer arm 117 may include a first arm segment that is pivotally coupled to a second arm segment, the first arm segment including the first end 118 of the closer arm 117 and the second arm segment including the second end 120 of the closer arm 117.

The closer body 114 may include an outer wall that generally defines an inner region 124 of the closer body 114. Further, according to certain embodiments, the outer wall may comprise of a plurality of sidewalls. Further, according to certain embodiments, the closer body 114 may include a cover (not shown), such as, for example, an ornamental cover, that may be positioned over at least a portion of the outer wall of the closer body 114.

Figure 4:
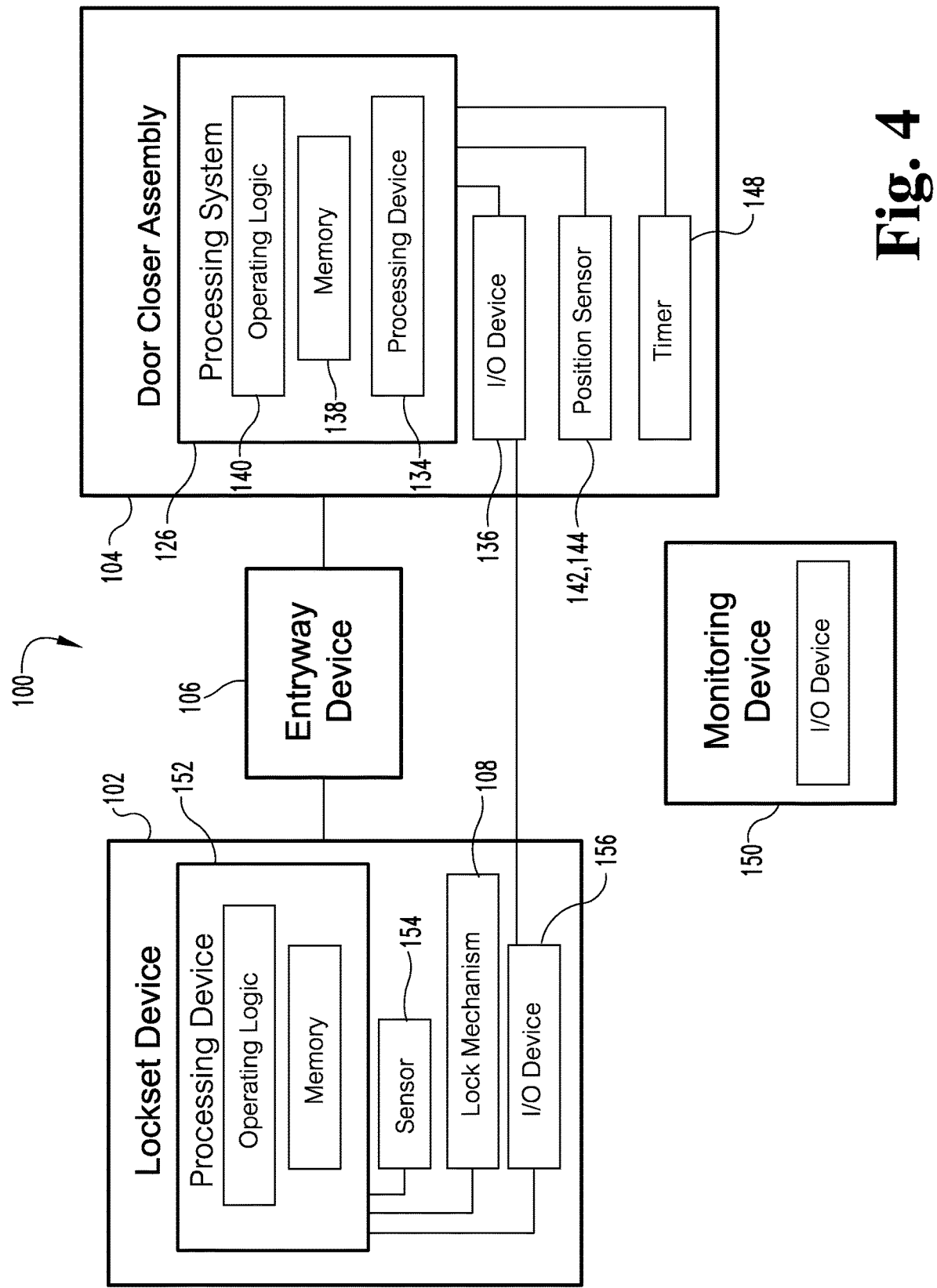
FIG. 4 illustrates a schematic of a block diagram of an exemplary processing system for a door closer assembly.

Referencing FIG. 4, the door closer assembly 104 may include a processing system 126 that may be used in connection with at least one or more operations for the door closer assembly 104, including, for example, determining and/or communicating information relating to the position of the door closer assembly 104 and/or the associated entryway device 106. Moreover, according to certain embodiments, the processing system 126 may interpret information and/or control the transmission of information to other components of the access control system 100. For example, referencing FIG. 1, according to certain embodiments, the door closer assembly 104 may be in communication with one or more devices of the access control system 100, including, for example, one or more servers 128, the lockset device 102, an access control panel or host 130, and/or a mobile electronic device 132, among other devices. Such communications with the door closer assembly 104 and other devices of the access control system 100 may occur in a variety of different manners, including, for example, over a wide area network (WAN) (e.g. the Internet), a cellular data network, a local area network (LAN), WIFI, and/or through the use of another type of wireless communication protocol, or any combination thereof. For example, according to certain embodiments, the door closer assembly 104 may be communicatively coupled to the lockset device 102, such as, for example, through a wired and/or wireless connection, such that communications from/to the door closer assembly 104 are transmitted, received and/or retrieved by an input/output device 156 of the lockset device 102. Further, according to certain embodiments, devices of the access control system 100 may directly and/or indirectly communicate with the door closer assembly 104. For example, according to certain embodiments, and as discussed below, the door closer assembly 104 includes an input/output device 136 that is adapted to communicate directly with other components of the access control system 100. Alternatively, the lockset device 102 may indirectly communicate with at least certain components of the access control system 100.

According to the illustrated embodiment, the processing system 126 of the door closer assembly 104 includes a processing device 134, the input/output device 136, a memory 138, operating logic 140, and/or a position sensor 142. The processing system 126 may be positioned about, or extend along, one or more portions of the door closer assembly 104. For example, according to the illustrated embodiment, the processing system 126 may be housed in the inner region 124 of the closer body 114. Further, the processing device 134 can be a programmable type, a dedicated, hardwired state machine, or any combination of thereof. Additionally, the processing device 134 may further include multiple processors, Arithmetic-Logic Units (ALUs), Central Processing Units (CPUs), Digital Signal Processors (DSPs), or the like. Further, according to certain embodiments in which the processing device 134 has multiple processing units, the processing units may utilize distributed, pipelined, and/or parallel processing. Further, the processing device 134 may be dedicated to performance of the operations described herein, or may be utilized in one or more additional applications or operations. In the depicted form, processing device 134 is of a programmable variety that executes algorithms and processes data in accordance with operating logic 140 as defined by programming instructions (such as software or firmware) stored in a memory 138. Alternatively, or additionally, the operating logic 140 for processing device 134 is at least partially defined by hardwired logic or other hardware. The processing device 134 may also include one or more components of any type suitable to process the signals received from an input/output device 136 or elsewhere, and to provide desired output signals. Such components may include, but are not limited to, digital circuitry, analog circuitry, or a combination of both.

The processing device 134 may be included with, or be coupled to, a memory 138. Further, the memory 138 may be of one or more types, such as, for example, a solid-state variety, electromagnetic variety, optical variety, or a combination of thereof. Additionally, the memory 138 can be volatile, nonvolatile, or a combination thereof, and some or all of the memory 138 can be of a portable variety, such as, but not limited to, a disk, tape, memory stick, cartridge, or the like. Additionally, the memory 138 can store data that is manipulated by the operating logic 140 of the processing device 134, such as, for example, data representative of signals received from and/or sent to input/output device 136 in addition to, or in lieu of, storing programming instructions defining the operating logic 140, just to name one example.

Additionally, the circuitry of the processing system 126 of the door closer assembly 104 may be configured to provide appropriate signal conditioning to transmit and receive desired information (data), and correspondingly may include filters, amplifiers, limiters, modulators, demodulators, CODECs, digital signal processing, and/or different circuitry or functional components to perform various selected communications. Further, as previously discussed, the door closer assembly 104 may communicate with the lockset device 102 and/or one or more other devices of the access control system 100 via the input/output device 136, such as, for example, via wireless communications, such as, but not limited to, communications that utilize WIFI and/or a wireless communication protocol, such as, for example, Bluetooth (including Bluetooth low energy), Zigbee, Near Field Communication (NFC), and/or IEEE 802.15, among others. For example, according to the illustrated embodiment, the input/output device 136 may be a transceiver that is coupled to the processing device 134 and which can output signals for transmission to, as well as receive signals from, other devices of the access control system 100. However, a variety of other components may be utilized for, or with, the input/output device 136 of the processing system 126 of the door closer assembly 104, including, but not limited to: a network adapter, network card, interface, or a port (e.g., a USB port, serial port, parallel port, an analog port, a digital port, VGA, DVI, HDMI, FireWire, CAT 5, or any other type of port or interface), as well as combinations thereof.

Alternatively, as previously mentioned, according to certain embodiments, rather than utilizing wireless communications, the processing system 126 of the door closer assembly 104 may be hardwired to a processing device 134 of the lockset device 102, among other devices of the access control system 100.

The position sensor 142 is adapted to sense a position or location of the door closer assembly 104, and thus the position or location of the entryway device 106. According to such an embodiment, the position sensor 142 is a magnetometer 144, such as, for example, a vector magnetometer, total field magnetometer, and/or a scalar magnetometer. Additionally, the magnetometer 144 may provide a variety of types of measurements or other information that may be utilized by a processing device of the magnetometer 144 and/or the processing device 134 of the processing system 126 of the door closer assembly 104. For example, according to certain embodiments in which the position sensor 142 is a magnetometer 144, the magnetometer 144 may provide measurements as a one, two, and/or three dimensional quantity, and/or as a scalar value(s), such as, but not limited to, scalar measurements along each of the three directional axes. However, a variety of other types of position sensors may be used to provide or determine the position of the door closer assembly 104, and thus the position of the entryway device 106. For example, the position sensor 142 may be an inductive sensor, reed switch, Hall Effect sensor, and/or a mechanical switch, among other types of sensors. Further, according to certain embodiments, the position sensor 142 may be incorporated into the circuitry of the processing device 134.

The position sensor 142 can be adapted to detect, or provide information that is used to detect, the position or orientation of the position sensor 142, a portion of the senor 142, or a reference point relative to the position sensor 142, and thereby detect the position of the associated door closer assembly 104. For example, according to embodiments in which the position sensor 142 is a magnetometer 144, the magnetometer 144 may detect changes in position of the magnetometer relative to a reference magnetic field. Thus, according to certain embodiments, the magnetometer 144 may be coupled to, or positioned along a portion of the door closer assembly 104 that is displaced with the displacement of the associated entryway device 106. Thus, according to such an embodiment, the reference magnetic field may be, relative to the magnetometer 144, generally relatively stationary or static. For example, according to certain embodiments, the reference magnetic field may be the magnetic field of the earth. According to other embodiments, the reference magnetic field may be provided by a reference magnet 146 that may be at a variety of locations adjacent to, within, and/or part of the, the door closer assembly 104. According to other embodiments, the reference magnet 146 may be a magnetized material that is used to form a portion of a device of the access control system 100, such as, for example a portion of the door closer assembly 104 or a door strike plate for the lockset device 102 that is mounted to the entryway frame 110 and/or wall 112, among other devices or components.

Conversely, according to other embodiments, the magnetometer 144 can be positioned at or about a portion of the door closer assembly 104 that remains relatively stationary or static, while the reference magnet 146 or magnetized material that provides the reference magnetic field is displaced by the displacement of entryway device 106 between the open and closed locations. For example, according to certain embodiments, the magnetometer 144 may be coupled to a stationary portion of the slide channel 116, while the closer body 114 may house or be coupled to the reference magnet 146. Alternatively, the closer body 114, among other components of the door closer assembly 104 that are displaced by the displacement of the entryway device 106 that includes a magnetized material that provides the reference magnetic field. According to other embodiments, the reference magnetic field may be provided by another component of the access control system 100 that are displaced by the displacement of the entryway device 106, such as, for example, a portion of the lockset device 102.

According to such embodiments, the position sensor 142 may be used to detect, or otherwise provide information that is used to detect, changes in location of the door closer assembly 104, and thus provide an indication of the displacement of the associated entryway device 106. Further, according to certain embodiments, the processing device 134 of the processing system 126 of the door closer assembly 104, or a processing device of another device(s) of the access control system 100, may analyze the information provided by the position sensor 142 to determine a position of the door closer assembly 104, which may, again, provide an indication of the position of the associated entryway device 106. Further, as discussed below, according to certain embodiments, the processing device 134 of the processing system 126 of the door closer assembly 104 may compare information that is being provided by position sensor 142 in view of reference information or data to determine whether the door closer assembly 104, and thus the associated entryway device 106, is, or is not, in the closed location, the current location of the either of those devices 104, 106, and/or the direction of such displacement.

The position sensor 142 of the door closer assembly 104 may be calibrated so that information provided by the position sensor 142 can be at least correlated to one or more positions of the door closer assembly 104, which may indicate corresponding positions of the associated entryway device 100. For example, according to certain embodiments, the position sensor 142 may be calibrated such that the processing device 134 of the door closer assembly 104, or other processing devices of devices of the access control system 100, may determine what information, such as a measurement(s) or range of measurements, provided by the position sensor 142 corresponds to the door closer assembly 104, and thus the entryway device 106, being in a first, closed location and/or a second, open position. Further, such information can be retained for future use in a number of manners such as, for example, as one or more sets of reference information or data by the memory 138 of the processing system 126 of the door closer assembly 104. Accordingly, instances in which the information subsequently provided by the position sensor 142 falls within and/or is consistent with an existing set of reference information or data, that particular set of reference information or data may provide an indication of the position of the door closer assembly 104 and/or the entryway device 106, such as, for example, an indication of whether such devices 104, 106 are in the open or closed location. Conversely, information subsequently provided by the position sensor 142 that falls outside of, or is otherwise inconsistent with, the existing reference information or data may indicate that the door closer assembly 104, and thus the entryway device 106, is not in any of the corresponding locations that are associated with the stored reference information.

A variety of reference location information may be utilized for one or more door closer assembly 104 positions. For example, according to certain embodiments, a first set or reference information or data, as provided by information from the position sensor 142, may correspond to the door closer assembly 104 and/or entryway device 106 being in the closed location. Similarly, in addition to, or in lieu of, the first set of reference information or data, a second set of reference information or data can correspond to the door closer assembly 104 and/or entryway device 106 being in the fully opened position. Further, a number of other reference locations may be attained, which may allow for a more precise determination of the location of the door closer assembly 104, and thus the entryway device 106, when the entryway device is between the open and closed locations. Further, for example, according to certain embodiments, the processing device 134 may utilize an algorithm to evaluate data or information provided by the position sensor 142 and/or the reference location information, to determine the location whether the door closer assembly 104, and thus the entryway device 106.

According to the illustrated embodiment, the processing device 134 of the processing system 126 of the door closer assembly 104 may evaluate information provided by the position sensor 142 and determine the position of the door closer assembly 104 and/or the entryway device 106. According to other embodiments, in addition to, or in lieu of the processing device 134 of the door closer assembly 104, one or more other components of the access control system 100 may retain the reference information or data from the calibration of the door closer assembly 104 and/or evaluate information provided by the position sensor 142 to determine the position of the door closer assembly 104, and thus the position of the associated entryway device 106. For example, according to certain embodiments, the reference information or data obtained by calibration of the door closer assembly 106 may be retained by a memory of the lockset device 102, server 128, and/or access control panel or host 130. Further, such information may be retrieved from the memory of other such devices of the access control system 100 and used by the processing devices of those devices, and/or used by a different one of those other devices, to determine the position of the door closer assembly 104 and/or the entryway device 106.

The position sensor 142 of the door closer assembly 104 may be calibrated in a number of manners. For example, according to certain embodiments, the position sensor 142 of the door closer assembly 104 may be calibrated through the use of the another device of the access control system 100, including, but not limited to, the mobile electronic device 132 or credential reader, among other devices. Moreover, such other devices of the access control system 100 may provide an indication of when the entryway device 106 is at a particular reference location, such as, for example at the closed and/or open positions. For example, a user of the mobile electronic device 132 may input information indicating the current position of the door closer assembly 104 and/or entryway device 106. The processing device 134 of the door closer assembly 104, via the input/output device 136, may directly or indirectly receive or retrieve such an indication of the current position of the door closer assembly 104 and/or entryway device 106 and correlate the information provided by the position sensor 142 at or around that time as being reference information or data for the indicated location. For example, according to certain embodiments, if the indicated location is the closed location of the door closer assembly 104 and/or the entryway device 106, the processing device 134 may designate the information provided by the position sensor 142 at or around that time as a first set of reference information or data that corresponds to the door closer assembly 104, and thus the entryway device 106, being in the closed location. Thus, according to certain embodiments, during subsequent operation of the entryway device 106, when the position sensor 142 provides information that falls within, or complies with, the first set of reference information or data, the processing device of the door closer assembly 104 may determine that the door closer assembly 104 and/or the entryway device 106 is at the closed location. According to such an embodiment, other sets of reference information or data for other door closer assembly 104 and/or the entryway device 106 positions may be attained, including, for example, a second set of reference information or data that indicates the door closer assembly 104 and/or the entryway device 106 is at the fully open position.

While the above example discusses calibrating the position sensor 142 of the door closer assembly 104 through the use, in part, of another device of the access control system 100, according to other embodiments, calibration of the position sensor 142 of the door closer assembly 104 may utilize components of the door closer assembly 104. For example, according to certain embodiments, the position of the arm coupling 122 that is displaceable along the slide channel 116 with the displacement of the closer arm 117 may be used to provide an indication to the processing device 134 of the door closer assembly 104 as to whether the door closer assembly 104, and thus the entryway device 106, is in the open or closed location. Further, the processing device 134 may evaluate the range of information provided by the position sensor 142 during the opening and closing of the entryway device 106 to generally determining which information corresponds to the door closer assembly 104, and thus the entryway device 106, being at certain reference locations, such as, for example, open and closed locations.

According to certain embodiments, the calibration of the door closer assembly 104, and moreover the ability to generally determine the location or position of the door closer assembly 104 and/or the entryway device 106, can allow the door closer assembly 104 to assist in the calibration of other components of the access control system 100. For example, a determination from information of the position sensor 142 of the door closer assembly 104 that the entryway device 106 is in the closed location may be communicated, or otherwise retrieved by, the lockset device 102. With information that the entryway device 106 is in the closed location, the lockset device 102 may calibrate its own sensor 154, such as a magnetometer of the lockset device 102. Moreover, information from the door closer assembly 104 indicating that the door closer assembly 104 and/or the entryway device 106 may be used by the processing device 152 of the lockset device to determine that the information currently being obtained by the sensor 154 of the lockset device 102 is to be associated with a closed location of the entryway device 106. According to such an embodiment and/or situation, during subsequent operation of the entryway device 106, the processing device 152 of the locket device 102, through information provided by the sensor 154 of the lockset device 102, may be able to determine when the entryway device 106 is in, or has returned to, the closed location. Such information as to when the entryway device 106 is in, or has returned to, the closed location may further assist in the operation of the associated lock mechanism 108. In addition to the lockset device 102, the calibrated information for the door closer system 104 may assist in the similar calibration of other devices of the access control system 100, including, but not limited to, credential readers and mobile electronic devices 132.

The information provided by evaluation of the information provided by the door closer assembly 104, and more particularly from evaluation of information obtained from the position sensor 142, may assist in monitoring the operation of the door closer assembly 104, and thereby assist in the maintenance and/or security of the access control system 100. For example, one or more components that are in communication, either directly or indirectly, with the door closer assembly 104, such as, for example, one or more access control panels or hosts 130 and/or servers 128, may store and/or monitor information relating to authorization to displace the entryway device 106 from the closed location to an open position, and/or monitor whether the entryway device 106 is, or is not, lockingly secured in a closed location. Thus, according to certain embodiments, the access control system 100 may monitor information provided from the door closer assembly 104, such as information obtained through use of the position sensor 142, to determine whether the entryway device 106 has been displaced to, or maintained at, an unauthorized position. For example, according to certain embodiments, in addition to determining the current position of the door closer assembly 104 and/or entryway device 106, one or more devices of the access control system 100, including, for example, the door closer assembly 104, lockset device 102, server 128, and/or access control panel or host 130, may also determine whether the door closer assembly 104, and thus the entryway device 106, is, or is not, authorized to be at, or away from, a particular position at that time. For example, according to certain embodiments, the access control system 100 may be managed such that the entryway device 106 is to remain locked at a closed location during certain time periods. During such periods, the magnetometer 144 may be expected to generally provide information that complies with a first set of reference information or data, such as, for example, one or more measurements or range of measurements, that corresponds to the door closer assembly 104 being in the closed location. Thus, during such time periods, discrepancies between the information provided by the position sensor 142 and the first set of reference information or data may provide an indication and/or warning that the door closer assembly 104, and thus, the entryway device 106, has been displaced away from the closed location. For example, such information may indicate that the entryway device 106 has potentially been propped and/or pried open. Further, according to certain embodiments, such discrepancies may be detected by the processing device 134 of the door closer assembly 104 and communicated via the input/output device 136 to other devices of the access control system 100, including, for example, the access control panel or host 130. Alternatively, such discrepancies may be determined by other devices of the access control system 100, including, but not limited to, the access control panel or host 130.

Additionally, the extent the door closer assembly 104, and thus the entryway device 106, is displaced from the closed location may provide an indication of the nature by which the entryway device 106 is being held open. For example, according to certain embodiments, if the location of the door closer assembly 104, and thus the entryway device 106, is relatively close to, but has not reached, the closed location may provide an indication that the entryway device 106 is being prevented from closing by a force such as, but not limited to, a negative air room pressure. Further, the presence of such interference in the ability of the door closer assembly 104 to return to a closed location may also be indicated by information from the magnetometer that indicates a sudden stoppage in the displacement of the door closer assembly 104, and thus the entryway device 106, to the closed location. Further, the larger the distance the door closer assembly 104 is from the closed location may provide an indication of the manner in which the entryway device 106 is potentially being propped or held open, including, for example, the size of the apparatus that may be holding the entryway device 106 open.

According to certain embodiments, the position sensor 142 of the door closer assembly 104 may be utilized in conjunction with a timer 148, which may or may not be communicatively coupled to the processing device 134 of the door closer assembly 104. For example, according to certain embodiments, the timer 148 may be part of a processing system 126 that is coupled to the closer body 114. Further, the timer 148 may be initiated in response to a variety of different events or conditions, including, for example, a change in the information provided by the position sensor 142. Further, the timer 148 may be used to monitor a variety of aspects of the access control system 100, including, for example, providing an indication that the entryway device 106 is being propped or held open, or otherwise being prevented from closing, including being prevented from being closed by negative room pressure. Further, according to certain embodiments, the processing device 134 may utilize the timer 148 to monitor whether the duration at which the door closer assembly 104, and thus the entryway device 106, is displaced away from the closed location exceeds a predetermined time period. For example, according to certain embodiments, the timer 148 may be initiated upon information from the position sensor 142 indicating that the door closer assembly 104, and thus the entryway device 106, has moved away from the closed location. The duration of time that the entryway device 106 is away from the closed location, as indicated by the timer 148, may provide, for example, an indication of the extent individuals may have had the opportunity to pass through the associated entryway. Moreover, the failure of the entryway device 106 to return to the closed location within the predetermined time period, as measured by the timer 148, may indicate whether the entryway device 106 is being held or propped open. Further, according to certain embodiments, the timer 148 may be used to evaluate the sweep time taken for the entryway device 106 to complete its displacement to the closed location and whether such sweep time exceeds a predetermined time period. Further, the processing device 134 may detect any changes in direction of the entryway device 106, as indicated by information provided by the position sensor 142, during such sweep time, as the change in direction may indicate unauthorized passage through the associated entryway.

The timer 148 may also provide an indication of the frequency at which the door closer assembly 104, and thus the entryway device 106, has experienced a change, if any, in the direction of displacement. Moreover, a series of changes in direction of displacement of the entryway device 106 in a relatively short time period, may provide an indication of unauthorized tailgating or repeated passage through the associated entryway.

Additionally, according to certain embodiments in which the door closer is adapted to automatically displace the entryway device 106 to a closed location, such as, for example, embodiments in which the door closer assembly 104 has an electric motor, the processing device 134 of the door closer assembly 104 may evaluate information from the position sensor 142 and/or the timer 148 and determine whether to attempt to automatically displace the entryway device 106 to the closed location. For example, according to certain embodiments, the processing device 134 may consider, based on information from the position sensor 142 and corresponding reference information or data, the proximity of the entryway device 106 to the closed location. Further, the processing device 134 may at least attempt to determine, based on information from the position sensor 142 indicating the direction of displacement of the entryway device 106 and/or the present location of the door closer assembly 104 whether the entryway device 106 was being returned to the closed location. The processing device 134 may also consider, based on information from the timer 148, the duration of time since the entryway device 106 has returned to the closed location, the duration of time since the last change in direction of displacement of the door closer assembly 104 and/or entryway device 106, and/or the frequency in changes in the direction of such displacements when evaluating whether to attempt to automatically return the entryway device 106 to the closed location.

The access control system 100 may further include one or more monitoring devices 150, such as, for example, a motion sensor 152a, video camera 152b, and/or microphone 152c, that may be activated in response to information provided by the position sensor 142 and/or the timer 148. Further, according to certain embodiments, the monitoring device 150 may be activated by an instruction that may be initiated by the processing device 134 of the door closer assembly 104. For example, according to certain embodiments, the processing device 134 of the door closer assembly 104, via the input/output device 136, may communicate an instruction directly or indirectly for the activation of the monitoring device 150. Further, according to certain embodiments, the door closer assembly 104 may transmit the signal to the access control panel or host 130 indicating a detected discrepancy in the operation of the door closer assembly 104 and/or entryway device 106 that may result in the access control panel or host 130 issuing an instruction to activate one or more monitoring devices 150 to monitor the area around or in the proximity of the associated entryway.

The monitoring device 150 may be initiated by a variety of types of information that is detected or otherwise indicated by the operation of the position sensor 142 and/or the timer 148. For example, according to certain embodiments, the monitoring device 150 may be activated when the processing device 134 detects that the position sensor 142 has indicated a plurality of changes in direction in a relatively short time period, as measured through the use of the timer 148, which may indicate, for example, at least the presence of tailgating through the associated entryway and/or the entryway device 106 being held or pried open. The processing device 134 may also activate the monitoring device 150 after the position sensor 142 indicates that the door closer assembly 104, and thus the entryway device 106, has not returned to the closed location within a predetermined time period, as indicated using information from the timer 148. Further, according to certain embodiments, the processing device 134 can activate the monitoring device 150 when information from the position sensor 142 indicates that the door closer assembly 104, and thus the entryway device 106, was in the process of being displaced toward the closed location before the entryway device 106 experienced a change in displacement direction, such as, for example, being displaced back toward an open position.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A door closer system, comprising:
a door closer assembly adapted for coupling to a door;
a position sensor associated with the door closer assembly and configured to detect data indicating a position of the door closer assembly; and
a processing device that i) receives detected data transmitted from the position sensor, ii) evaluates the detected data in view of one or more sets of reference data that correspond to one or more positions of the door closer assembly, and iii) determines, based on evaluation of the detected data and the one or more sets of reference data, a current position of the door closer assembly, and wherein the one or more sets of reference data include a first set of reference data that corresponds to the door closer assembly being at a closed position;
wherein the detected data comprise one or more measurements, and wherein the data of the one or more sets of reference data comprise ranges of measurements;
wherein the processing device further activates a timer upon detection of displacement of the door closer assembly from the closed positon to an open position;
wherein the processing device further determines, through use of the timer, whether the door closer assembly has been at the open position for a period of time that exceeds a predetermined time period; and
wherein the processing device further activates one or more monitoring devices to monitor an area around an entryway if the period of time that the door closer assembly has been at the open position is determined to exceed the predetermined time period.

2. The door closer system of claim 1, wherein the processing device further determines whether the detected data is, or is not, consistent with data of the first set of reference data.

3. The door closer system of claim 1, wherein the one or more monitoring devices includes a camera.

4. The door closer system of claim 1, wherein the position sensor further detects a plurality of changes in one or more directions of displacement of the door closer assembly; and
wherein the processing device further evaluates, using the timer, a frequency of the detected plurality of changes in the one or more directions of displacement of the door closer assembly.

5. The door closer system of claim 4, wherein the one or more directions of displacement of the door closer assembly comprises an opening direction and a closing direction; and
wherein the plurality of changes in the one or more directions of displacement of the door closer assembly comprises a plurality of changes between the opening direction and the closing direction.

6. The door closer system of claim 4, wherein the processing device further determines a number of changes in the one or more directions of displacement of the door closer assembly between activation of the timer and a return of the door closer assembly to the closed position.

7. The door closer system of claim 4, wherein the processing device further activates one or more monitoring devices if the frequency of the detected plurality of changes in the one or more directions of displacement of the door closer exceeds a predetermined frequency of changes in the directions of displacement.

8. The door closer system of claim 1, wherein the processing device is located in the door closer assembly.

9. The door closer system of claim 1, wherein the processing device is located within a lock device, different from the door closer system, positioned on or adjacent to the door.

10. The door closer system of claim 1, wherein the position sensor is an inductive sensor.

11. The door closer system of claim 1, wherein at least a portion of the position sensor is coupled to the door closer assembly.

12. The door closer system of claim 1, wherein the detected data transmitted from the position sensor to the processing device is transmitted wirelessly via Bluetooth communication.

13. The door closer system of claim 1, wherein the detected data transmitted from the position sensor to the processing device is transmitted wirelessly via a wireless connection.

14. A door closer system, comprising:
a door closer assembly adapted for coupling to a door;
a position sensor associated with the door closer assembly and configured to detect data indicating a position of the door closer assembly; and
a processing device that i) receives detected data transmitted from the position sensor, ii) evaluates the detected data in view of one or more sets of reference data that correspond to one or more positions of the door closer assembly, and iii) determines, based on evaluation of the detected data and the one or more sets of reference data, a current position of the door closer assembly, wherein the one or more sets of reference data include a first set of reference data that corresponds to the door closer assembly being at a closed position; and
wherein the processing device further calibrates a second sensor using the detected data.

15. The door closer system of claim 14, wherein the second sensor is a magnetometer.

16. A door closer system, comprising:
a door closer assembly adapted for coupling to a door;
a position sensor associated with the door closer assembly and configured to detect data indicating a position of the door closer assembly; and
a processing device that i) receives detected data transmitted from the position sensor, ii) evaluates the detected data in view of one or more sets of reference data that correspond to one or more positions of the door closer assembly, and iii) determines, based on evaluation of the detected data and the one or more sets of reference data, a current position of the door closer assembly, wherein the one or more sets of reference data include a first set of reference data that corresponds to the door closer assembly being at a closed position; and wherein the processing device calibrates a second sensor based on the data corresponding to the position of the door closer assembly.

17. The door closer system of claim 16, wherein the second sensor comprises a magnetometer located within a lock device, different from the door closer system, positioned on or adjacent to the door.

18. The door closer system of claim 16, wherein the processing device is located within either the door closer assembly or a lock device positioned on or adjacent to the door.

19. The door closer system of claim 16, wherein the processing device calibrates the second sensor based in part on the determination that the door closer assembly is at the closed position.

20. The door closer system of claim 19, wherein the second sensor is a magnetometer.

21. The door closer system of claim 16, wherein the processing device further determines whether the detected data is, or is not, consistent with data of the first set of reference data.

* * * * *